Figure 1:
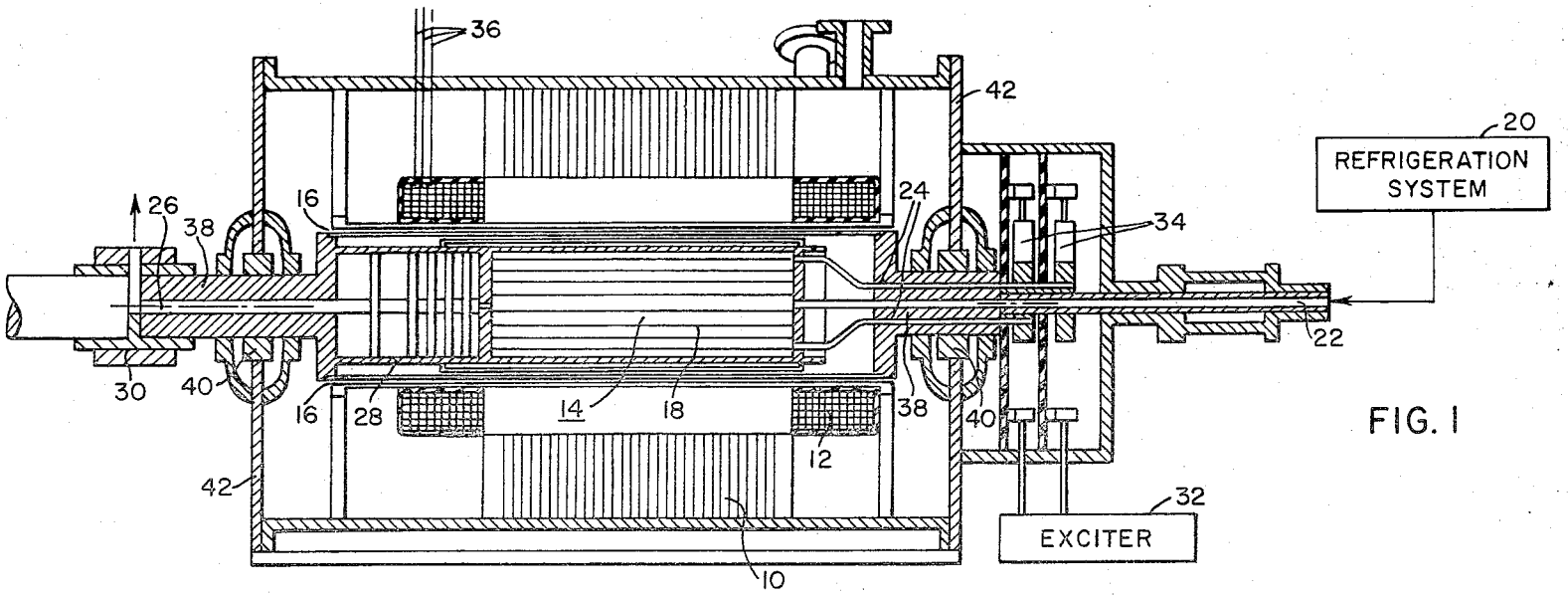
Figure 2:
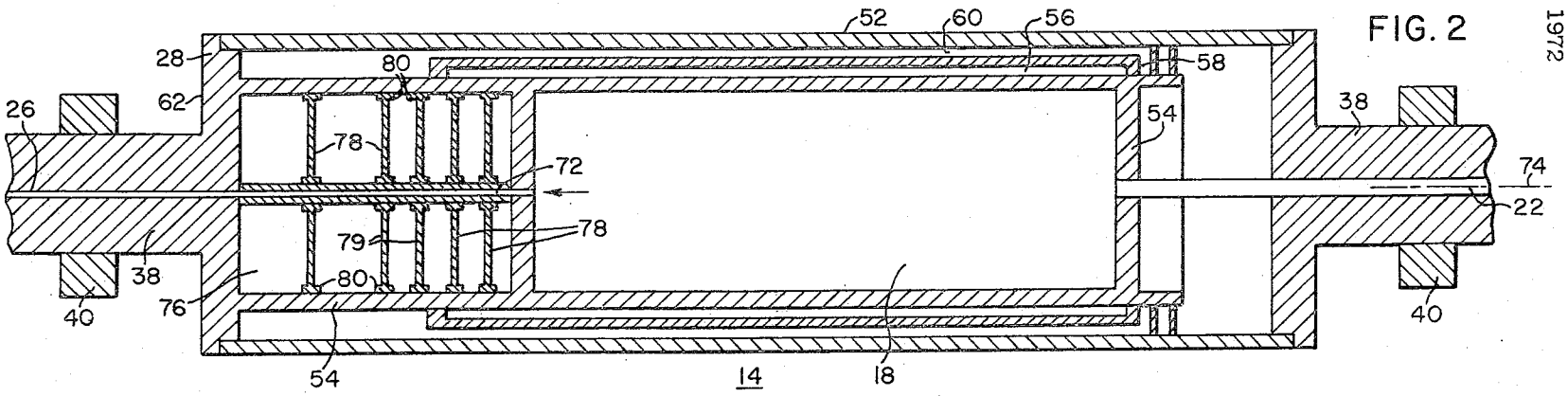

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 11, 1973

914 O.G. 398

T914,004

FLUID-COOLED ROTATING MEMBER WITH IMPROVED COOLANT EXHAUST STRUCTURE SUITABLE FOR SUPERCONDUCTING DYNAMOELECTRIC MACHINERY

Donald C. Litz, Monroeville, Pa., assignor to Westinghouse Electric Corporation, Pittsburgh, Pa.

Filed June 15, 1972, Ser. No. 263,039
Int. Cl. H02k *9/00*
U.S. Cl. 310—52
1 Sheet Drawing. 9 Pages Specification

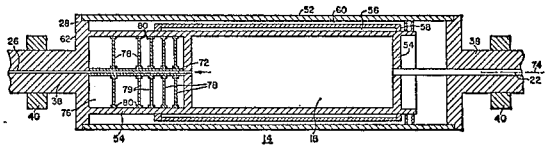

In a fluid-cooled rotating member, such as a dynamoelectric machine rotor with superconducting windings, the fluid exhaust is used to cool structural members connecting ambient and cool zones in order to minimize heat flow to the cold elements. The coolant in the exhaust structure is confined to a path along the axis of rotation. This avoids radial coolant flow paths and radially displaced coolant flow paths in order to eliminate convection currents. The axially located coolant conduit 72 is surrounded by and spaced from a supporting sleeve 54 with a plurality of thermally conductive members 78, 79 extending between the coolant conduit and the supporting sleeve through an evacuated volume at axially spaced intervals.

FLUID-COOLED ROTATING MEMBER WITH IMPROVED COOLANT EXHAUST STRUCTURE SUITABLE FOR SUPERCONDUCTING DYNAMOELECTRIC MACHINERY

Filed June 15, 1972